United States Patent [19]

Utsumi et al.

[11] 4,325,763

[45] Apr. 20, 1982

[54] METHOD OF MANUFACTURING CERAMIC CAPACITORS

[75] Inventors: Kazuaki Utsumi; Masatomo Yonezawa; Tomeji Ohno, all of Tokyo, Japan

[73] Assignee: Nippon Electric Company, Ltd., Tokyo, Japan

[21] Appl. No.: 203,700

[22] Filed: Nov. 3, 1980

Related U.S. Application Data

[63] Continuation of Ser. No. 32,403, Apr. 23, 1979, abandoned.

[30] Foreign Application Priority Data

Apr. 25, 1978 [JP]  Japan .................................. 53/49490
Apr. 25, 1978 [JP]  Japan .................................. 53/49491

[51] Int. Cl.³ ...................... C03B 29/00; C04B 33/34; C04B 43/00; H01G 4/10
[52] U.S. Cl. ..................................... 156/89; 156/297; 252/62.2; 361/322; 361/313; 156/89;182;191;297
[58] Field of Search ............... 361/321, 322, 320, 313, 361/311, 330; 252/62.2

[56] References Cited

U.S. PATENT DOCUMENTS 3,544,330  1/1970  Hoffman .............................. 361/321

FOREIGN PATENT DOCUMENTS 54-44967  10/1979  Japan .................................. 361/321
54-44968  10/1979  Japan .................................. 361/321
54-44970  10/1979  Japan .................................. 361/321

OTHER PUBLICATIONS

Modern Dielectric Materials, Birks ©1960, Heywood & Co. Ltd., London Chapter 8, p. 1.

*Primary Examiner*—Edward C. Kimlin
*Assistant Examiner*—Louis Falasco
*Attorney, Agent, or Firm*—Blakely, Sokoloff, Taylor & Zafman

[57] ABSTRACT

A ceramic capacitor is prepared by corting an electrode paste on the opposite surfaces of a green ceramic body. The electrode paste contains an inorganic binder having the same composition as the green ceramic body. Then the green ceramic body is sintered and at the same time the electrode paste is baked to form electrodes for attaching lead wires.

5 Claims, No Drawings

METHOD OF MANUFACTURING CERAMIC CAPACITORS

This is a continuation of application Ser. No. 032,403, filed Apr. 23, 1979 abandoned.

BACKGROUND OF THE INVENTION

This invention relates to a method of manufacturing a ceramic capacitor, more particularly a plane ceramic capacitor.

Heretobefore, a plane ceramic capacitor has been manufactured by forming a circular pressed plate by using a tablet machine, or punching a green ceramic sheet containing an organic binder into a chip having a definite configuration and then sintering the chip in a furnace under a definite condition.

After aligning a definite number of chips electrodes are printed on the opposite surfaces of the chips by screen printing technique, offset printing technique, anastatic printing technique, or intaglio printing technique. After drying, the chips are loaded again in a furnace to bake the printed electrodes thus completing ceramic capacitors.

According to this method, before printing the electrodes it is necessary to neatly align the chips. However, due to warping and deformation caused by sintering it is difficult to automatically align the chips. For this reason, it has been the practice to manually align the chips thus increasing the labor and process steps. Such method is not suitable for mass production and difficult to decrease the cost of manufacturing. Moreover, the printing speed is of the order of a fraction of a second per one ceramic capacitor with mechanical printing method. Moreover, the deformation decreases the yield of satisfactorily printed chips and the accuracy of printing of the electrodes thus increasing the cost of manufacturing the ceramic capacitors.

SUMMARY OF THE INVENTION

Accordingly, it is an object of this invention to provide an improved method of manufacturing a ceramic capacitor suitable for mass production which, can greatly decrease the number of steps thus improving the yield and decreasing the cost of manufacturing.

According to this invention there is provided a method of manufacturing a ceramic capacitor comprising the steps of coating an electrode paste on the opposite surfaces of a green ceramic body, the electrode paste containing an inorganic binder having the same or similar composition as the green ceramic body, and sintering the green ceramic body concurrently with the baking of the electrode paste thereby forming electrodes.

According to a modified embodiment of this invention there is provided a method of manufacturing a laminated ceramic capacitor comprising the steps of laminating a plurality of green ceramic sheets each coated with an electroconductive paste, coating an electrode paste on the opposite surfaces of the lamination, the electrode paste containing an inorganic binder having the same or similar composition as the green ceramic sheets and sintering the lamination concurrently with the baking of the electrode paste thereby forming electrodes for bonding lead wires.

More particularly, according to this invention, both surfaces of a green ceramic sheet or press molded green ceramic body are printed with an electrode paste containing an inorganic binder having the same composition as the green ceramic sheet, the printed sheet is then punched into chips, and the chips are placed in a furnace to simultaneously sinter the chips and bake the electrode paste thus obtaining a ceramic capacitors with electrodes for attaching lead wires. According to this invention, it is possible to eliminate the chip aligning step at the time of printing the electrode paste and electrode baking step, and to improve the accuracy of electrode printing and the yield of satisfactory products.

It is not always necessary that the binder is of the same composition as the ceramic capacitor but may have slightly different composition. Moreover, the printing speed can be increased greatly because many capacitors can be printed at the same time with an automatic machine.

DESCRIPTION OF THE PREFERRED EMBODIMENTS

To have better understanding of the invention the following examples are given but not for limitation.

EXAMPLE 1

A powder consisting essentially of a mixture of Pb(Fe$_{\frac{2}{3}}$W$_{\frac{1}{3}}$)O$_3$ and Pb(Fe$_{\frac{1}{2}}$Nb$_{\frac{1}{2}}$)O$_3$ was dispersed in a solvent such as ethylene glycol monomethyl ether together with an organic binder such as polyvinyl alcohol or polyvinyl buthral to form a slurry.

The slurry was then used to prepare a green ceramic sheet having a thickness of from about 30 to 200 μm by using of a doctor plate. The green ceramic sheet was punched into rectangular pieces each having a dimension of 60 mm×40 mm and several pieces were heat-pressed to obtain a lamination having a predetermined thickness.

An electrode paste containing a powder of a silver-palladium alloy and an inorganic binder having the same composition as the green ceramic sheet was printed on both surfaces of the lamination by screen printing technique.

The printed lamination of the green ceramic sheet was then cut into chips having a predetermined size by a cutter, and the chips were then sintered at a temperature of 800° C.~1100° C. for one hour. Lead wires were then soldered to both electrodes of each sintered chips to complete ceramic capacitors. The dielectric characteristics of the capacitors were measured and the result is shown in the following Table 1, in which the capacitance (c) and the dielectric loss (tan δ) were measured with a capacitance bridge operating with an alternating current having a frequency of 1 kHz. The capacitance was measured in a temperature range of from −30° C. to +85° C. and the capacitance value at +20° C. was used as a refeence for determining the temperature stability.

TABLE 1

| sample number | electrode paste composition (weight %) | | $\epsilon 20$ | tan δ 20 (%) | percentage of variation of ε with temp. −30° C. ~ +85° C. |
|---|---|---|---|---|---|
| | silver palladium alloy | mixture | | | |
| 1 | 99 | 1 | 18500 | 0.13 | +10 ~ −76 |
| 2 | 90 | 10 | 18000 | 0.15 | +12 ~ −76 |
| 3 | 80 | 20 | 17800 | 0.16 | +11 ~ −77 |
| 4 | 70 | 30 | 16900 | 0.18 | +12 ~ −77 |
| 5 | 60 | 40 | 16400 | 0.18 | +12 ~ −76 |

TABLE 1-continued

| sample number | electrode paste composition (weight %) silver palladium alloy | mixture | $\epsilon 20$ | tan δ 20 (%) | percentage of variation of $\epsilon$ with temp. −30° C. ~ +85° C. |
|---|---|---|---|---|---|
| 6* | 80 | — | 8900 | 1.79 | +16 ~ −62 |
| 7* | 90 | — | 10600 | 0.17 | +16 ~ −65 |

*control samples which utilize glass frit as the inorganic binder

EXAMPLE 2

A powder consisting essentially of a mixture of Pb (Fe$_{\frac{2}{3}}$ W$_{\frac{1}{3}}$)O$_3$ and Pb (Zn$_{\frac{1}{3}}$ Nb$_{\frac{2}{3}}$)O$_3$ was dispersed in a solvent such as ethylene glycol monomethyl ether together with an organic binder such as polyvinyl alcohol to obtain slurry.

The slurry was then used to prepare a green ceramic sheet having a uniform thickness of 0.5~1.0 mm with an extruder. The green ceramic sheet was punched into rectangular pieces each having a dimension of 60 mm×40 mm. An electrode paste containing a powder of silver and an inorganic binder having the same composition as the green ceramic sheet was printed on the opposite surfaces of each piece by screen printing technique. The printed sheet was then punched into chips having a predetermined dimension and the chips were then sintered at a temperature of 900° C. for one hour. Lead wires were then soldered to both electrodes of each sintered chip to complete a ceramic capacitor. The dielectric characteristics of the ceramic capacitor were measured under the same condition as in Example 1 and results are shown in the following Table 2.

TABLE 2

| sample number | electrode paste composition (weight %) silver | mixture | $\epsilon 20$ | tan δ 20 (%) | percentage of variation of $\epsilon$ with temp. −30° C. ~ +85° C. |
|---|---|---|---|---|---|
| 8 | 99 | 1 | 800 | 0.78 | +6 ~ −14 |
| 9 | 90 | 10 | 820 | 0.68 | +5 ~ −13 |
| 10 | 80 | 20 | 810 | 0.65 | +5 ~ −14 |
| 11 | 70 | 30 | 810 | 0.60 | +6 ~ −15 |
| 12 | 60 | 40 | 820 | 0.55 | +5 ~ −12 |
| 13* | 80 | — | 380 | 1.78 | +8 ~ −18 |
| 14* | 90 | — | 420 | 1.45 | +17 ~ −16 |

*control samples utilizing glass frit as the inorganic binder.

As can be noted from Tables 1 and 2 the ceramic capacitors of this invention have a large dielectric constant and a small dielectric loss and the percentage of variation of the dielectric constant is small enough to satisfy practical regulations. Thus, the capacitors manufactured by the method of this invention can be used practically.

Control samples 6, 7, 13 and 14 which utilize glass frit as the inorganic binder have greatly decreased dielectric constant. It is presumed that this was caused by the fact that the glass frit has dispersed through the chips thus changing its composition.

As above described according to this invention a binder having the same composition as the chip is used as the inorganic binder of the electrodes so that there is no fear of changing the composition of the chip and the electrodes are firmly bonded to the chip at the time of sintering.

Where the inorganic binder contains 1 to 40% by weight of a powder having the same composition as the green ceramic sheet or pressed pieces thereof the bonding strength of the electrodes is large and the solderbility is excellent.

Similar experiments were made in which various alloys of two or more of Pt, Pd, Au and Ag were used as the electrode material and similar results were obtained as this example.

Furthermore, according to this invention laminated ceramic capacitors can be manufactured by laiminating a plurality of green ceramic sheets with their opposite surfaces printed with an electroconductive paste, cutting the lamination into chips having a predetermined configuration, coating a metallic electrode paste containing a powder having the same composition as the green ceramic sheet onto the chips, sintering the chips concurrently with the bonding of the lead wires to electrodes. Since this method can eliminate the electrode baking step and since the electrodes for connecting the lead wires are coated prior to the sintering step, the deformation of the chips can be prevented. Accordingly where the chips are processed by an automatic machine, the yield can be greatly improved, to near 100%. Thus, this method is suitable for mass production and can decrease the cost of manufacturing.

The following examples illustrate this modified method.

EXAMPLE 3

A powder consisting essentially of a mixture Pb (Fe$_{\frac{2}{3}}$ W$_{\frac{1}{3}}$)O$_3$ and Pb (Fe$_{\frac{1}{2}}$ Nb$_{\frac{1}{2}}$)O$_3$ was dispersed in a solvent such as ethylene glycol monoethyl ether together with an organic binder such as polyvinyl alcohol to form a slurry.

The slurry was coated with a doctor blade to form a green ceramic sheet having a thickness of about 30 to 200 μm. The green ceramic sheet was punched into rectangular pieces each having a dimension of 60 mm×40 mm and one surface of each pieces were printed with an electroconductive paste. A plurality of pieces were laminated and bonded together under pressure. The lamination was cut into green chips with a cutting blade.

An electrode paste comprising a mixture of a powder of a silver-paradium alloy and an inorganic binder having the same composition as the green ceramic sheet was coated by dip process on the opposing side faces of each green chip where the electroconductive paste of the laminated green sheet was exposed. Thereafter the chips were dried at 80° C., and then sintered at a temperature of 800°~1100° C. for one hour and the external electrodes were formed.

Lead wires were soldered to the external electrodes of the sintered chips to complete ceramic capacitors. The dielectric characteristics of the ceramic capacitors were measured and the result is shown in the following Table 3.

The capacitance (c) and the dielectric loss were measured with a capacitance bridge operating with an alternating current of 1 kHz.

The capacitance was measured at a temperature in a range of −30° C. to +85° C. and the temperature stability of the capacitance was measured by taking the capacitance at +20° C. as a reference.

TABLE 3

| sample number | electrode paste composition (weight %) silver palladium alloy | mixture | C20 (nF) | tan δ | percentage of variation of C with temp. −30° C. ~ +85° C. |
|---|---|---|---|---|---|
| 1 | 99 | 1 | 118 | 0.54 | +10 ~ −74 |
| 2 | 90 | 10 | 120 | 0.48 | +13 ~ −72 |
| 3 | 80 | 20 | 116 | 0.39 | +12 ~ −77 |
| 4 | 70 | 30 | 112 | 0.32 | +11 ~ −76 |
| 5 | 60 | 40 | 114 | 0.30 | +11 ~ −77 |
| 6* | 80 | — | 50.2 | 1.72 | +18.5 ~ −56.2 |
| 7* | 90 | — | 55.4 | 1.53 | +20.5 ~ −67.0 |
| 8** | 80 | — | 73.2 | 0.75 | +12 ~ −77 |
| 9** | 90 | — | 79.6 | 0.98 | +11 ~ −76 |

*control samples in which glas frit was added as the inorganic binder
**control samples in which an electrode paste incorporated with glass frit as the inorganic binder was used and the electrodes were baked by the conventional method

EXAMPLE 4

A powder consisting essentially a mixture of Pb (Fe$_{\frac{2}{3}}$ W$_{\frac{1}{3}}$)O$_3$ and Pb (Zn$_{\frac{1}{3}}$ Nb$_{\frac{2}{3}}$)O$_3$ was dispersed in solvent such as ethylene glycol monomethyl ether together with an organic binder such as polyvinyl alcohol to form a slurry. The slurry was formed into a green ceramic sheet having a thickness of about 30 to 200 microns by using a doctor blade. The green ceramic sheet was punched into rectangular pieces each having a dimention of 60 mm × 40 mm and an electroconductive paste was printed on one surface of each piece. Then the pieces were laminated and bonded into an integral lamination by applying pressure. The lamination was then cut into green chips with a cutting blade.

An electrode paste containing a powder of silver and a powder of an inorganic binder having the same composition as the green ceramic sheet was coated by dip method on the opposing side faces of each green chip where the electroconductive paste of the laminated green sheet was exposed. Thereafter, the chips were dried at a temperature of 80° C. and then sintered at a temperature of 800°~900° C. for one hour and the external electrodes were formed.

Lead wires were soldered to the electrodes of the sintered chips to complete ceramic capacitors. The dielectric characteristics of the capaciters were measured and obtained results as shown in Table 4 below. The conditions of measurement were the same as in Example 1.

TABLE 4

| sample number | electrode paste composition (weight %) silver | mixture | C20 (nF) | tan δ 20 (%) | percentage of variation of C with temp. −30° C. ~ +85° C. |
|---|---|---|---|---|---|
| 10 | 99 | 1 | 10.32 | 0.50 | +6 ~ −11 |
| 11 | 90 | 10 | 11.63 | 0.58 | +5 ~ −12 |
| 12 | 80 | 20 | 11.51 | 0.63 | +6 ~ −12 |
| 13 | 70 | 30 | 12.24 | 0.65 | +4 ~ −13 |
| 14 | 60 | 40 | 11.13 | 0.70 | +5 ~ −12 |
| 15* | 80 | — | 4.62 | 1.25 | +5 ~ −12 |
| 16* | 90 | — | 5.83 | 0.90 | +5 ~ −13 |
| 17** | 80 | — | 7.42 | 0.87 | +5 ~ −11 |
| 18** | 90 | — | 8.05 | 0.80 | +6 ~ −12 |

*control samples utilizing glass frit as the inorganic binder
**control samples utilizing electrode paste incorporated with glass frit as the inorganic binder and the electrode was then baked by the conventional method.

As can be clearly noted from Tables 3 and 4 the laminated ceramic capacitors manufactured according to the method of this invention have sufficiently large capacitance, small dielectric loss and percentage of variation of their capacitance with temperature is small enough to meet practical regulations. Thus, the laminated ceramic capacitors of this invention can be used practically.

Although control samples 6, 7, 15 and 16 utilizing glass frit as the inorganic binder were designed to have the same capacitance as those utilizing the mixture as the inorganic binder, their actual capacitance is only one half of the capacitors manufactured by the method of this invention, and their dielectric loss is also large. It is presumed that this was caused by the fact that the glass frit diffuses into the chips thus changing the composition of the dielectric substance. Furthermore, although controls samples 8, 9, 17 and 18 which were manufactured by a conventional methods were designed to have the same capacity as those manufactured by the method of this invention, their capacitance is only $\frac{2}{3}$ of that of the capacitor of this invention and their value of tan δ is large. It is also presumed that these inferior characteristics were caused by the fact that the glass frit contained in the electrode paste has diffused into the chips thus changing the composition thereof.

As above described, according to this invention, since a binder having the same composition as that of the green ceramic sheet is used as the inorganic binder for the electrode paste it is possible to simultaneously bake the electrodes and sinter the laminations.

Where the electrode paste contains 1 to 40% by weight of inorganic binder having the same composition as the green ceramic sheet the electrodes are strongly adhered to the dielectric chips. In addition, the solderbility of the lead wires to the baked electrodes can also be improved. The range of the inorganic binder is not limited to the above described examples but may be from 1 to 50% by weight. Preferred range is from 5 to 40% by weight.

In addition to the materials described above, the enternal electrodes can also be made of one or more of Pt, Pd, Au and Ag, or alloys thereof. The results of experiment showed that these metals and alloys are also effective.

What is claimed is:
1. A method of manufacturing a ceramic capacitor comprising the steps of coating an electrode paste on only an outer layer of the opposite surfaces of a green ceramic body, said electrode paste containing silver as a major ingredient, and a binder having 1 to 50% by weight of an inorganic binder having the same composition as said green ceramic body and sintering said green ceramic body concurrently with the baking of said electrode paste, wherein said green ceramic body is prepared by dispersing a powder consisting essentially of a mixture of $Pb(Fe_{2/3}W_{1/3})O_3$ and $Pb(Fe_{1/2}Nb_{1/2})O_3$, or a mixture of $Pb(Fe_{2/3}W_{1/3})O_3$ and $Pb(Zn_{1/3}Nb_{2/3})O_3$ in a solvent together with an organic binder to form a slurry and then forming the slurry into said green ceramic body.

2. A method of manufacturing a laminated ceramic capacitor comprising the steps of laminating a plurality of green ceramic sheets each coated with an electroconductive paste, coating an electrode paste on only an outer layer of the opposite side faces of the lamination where said electroconductive paste is exposed, said electrode paste containing silver as a major ingredient, and a binder having 1 to 50% by weight of an inorganic binder having the same composition as the green ceramic sheets, and sintering said lamination concurrently with the baking of said electrode paste, wherein said green ceramic body is prepared by dispersing a powder consisting essentially of a mixture of $Pb(Fe_{2/3}W_{1/3})O_3$ and $Pb(Fe_{1/2}Nb_{1/2})O_3$, or a mixture of $Pb(Fe_{2/3}W_{1/3})O_3$ and $Pb(Zn_{1/3}Nb_{1/3})O_3$ in a solvent together with an organic binder to form a slurry and then forming the slurry into said green ceramic body.

3. A method of manufacturing a ceramic capacitor comprising the steps of coating an electrode paste on only an outer layer of the opposite surfaces of a green ceramic body, said electrode paste containing silver as a major ingredient and a binder having 1 to 50% by weight of an inorganic binder having a composition similar to that of said green ceramic body and sintering said green ceramic body concurrently with baking of said electrode paste, wherein said green ceramic body is prepared by dispersing a powder consisting essentially of a mixture of $Pb(Fe_{2/3}W_{1/3})O_3$ and $Pb(Fe_{1/2}Nb_{1/2})O_3$, or a mixture of $Pb(Fe_{2/3}W_{1/3})O_3$ and $Pb(Zn_{1/3}Nb_{1/3})O_3$ in a solvent together with an organic binder to form a slurry and then forming the slurry into said green ceramic body.

4. A method of manufacturing a laminated ceramic capacitor comprising the steps of laminating a plurality of green ceramic sheets each coated with an electroconductive paste, coating an electrode paste on only an outer layer of the opposite side faces of the lamination where said electroconductive paste is exposed, said electrode paste containing silver as a major ingredient and a binder having 1 to 50% by weight of an inorganic binder having a composition similar to that of said green ceramic sheets, and sintering said lamination concurrently with the baking of said electrode paste, wherein said green ceramic body is prepared by dispersing a powder consisting essentially of a mixture of $Pb(Fe_{2/3}W_{1/3})O_3$ and $Pb(Fe_{1/2}Nb_{1/2})O_3$, or a mixture of $Pb(Fe_{1/70}W_{1/3})O_3$ and $Pb(Zn_{1/3}Nb_{178})O_3$ in a solvent together with an organic binder to form a slurry and then forming the slurry into said green ceramic body.

5. The method according to claims 1, 2, 3 or 4, wherein the electrode paste contains silver in the composition of an alloy component selected from the group consisting of Ag-Pd and Ag-Au.

* * * * *

UNITED STATES PATENT AND TRADEMARK OFFICE
CERTIFICATE OF CORRECTION

PATENT NO. : 4,325,763
DATED : Apr. 20, 1982
INVENTOR(S) : Utsumi et al.

It is certified that error appears in the above-identified patent and that said Letters Patent is hereby corrected as shown below:

| COLUMN | LINE | DESCRIPTION |
|---|---|---|
| 5 | 66 | Delete "+5", insert --+6--. |
| 8 | 22 | Delete "$Fe_{170}$", insert --$Fe_{2/3}$--. |
| 8 | 23 | Delete "$Nb_{178}$", insert --$Nb_{1/2}$--. |

Signed and Sealed this

Sixteenth Day of July 1985

[SEAL]

Attest:

DONALD J. QUIGG

*Attesting Officer*     *Acting Commissioner of Patents and Trademarks*